F. NESTOR.
COOKING UTENSIL.
APPLICATION FILED FEB. 11, 1909. RENEWED MAR. 20, 1912.

1,041,332.

Patented Oct. 15, 1912.

WITNESSES:
H. C. Sanderson
Q. G. Knapp

INVENTOR
French Nestor

UNITED STATES PATENT OFFICE.

FRENCH NESTOR, OF ELKINS, WEST VIRGINIA.

COOKING UTENSIL.

1,041,332.  Specification of Letters Patent.  Patented Oct. 15, 1912.

Application filed February 11, 1909, Serial No. 477,458. Renewed March 20, 1912. Serial No. 684,972.

*To all whom it may concern:*

Be it known that I, FRENCH NESTOR, a citizen of the United States, and resident of the city of Elkins, in the county of Randolph and State of West Virginia, have invented an Improved Cooking Utensil, of which the following is a specification.

This invention relates to cooking vessels, and has particular reference to that form of cooking vessel shown in my prior Patent No. 882,411, issued March 17, 1908. The device set forth in the above mentioned patent consists of an open cylindrical vessel having a tank seated thereon, with mechanical means, preferably float-controlled, for automatically feeding a liquid from the tank to the lower vessel when the level of liquid therein sinks below a predetermined point, thus operating to maintain a constant level of liquid in the lower vessel.

The object of the present invention is to provide new and improved means for automatically maintaining the level of liquid in a cooking vessel constant at any desired or predetermined point, and to provide a form of construction for a device of the nature described which is simpler and more practical than that shown in the patent cited, thus at the same time reducing cost of manufacture and securing added simplicity and efficiency in operation.

Other objects and advantages will appear from the reading of this specification, and the novel features of the invention are particularly pointed out in the appended claims.

I have illustrated my invention in the accompanying drawings, in which—

Figure 1:
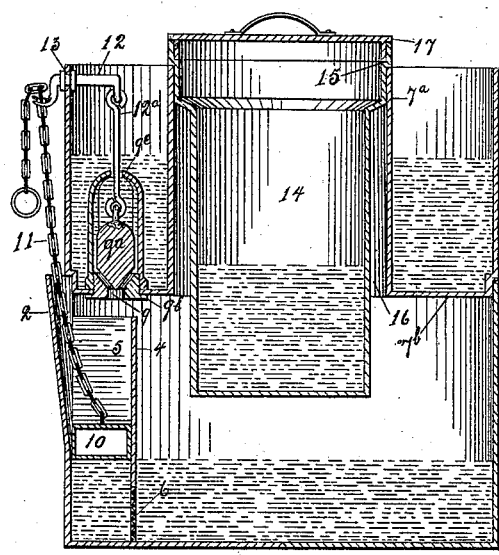
Figure 3:
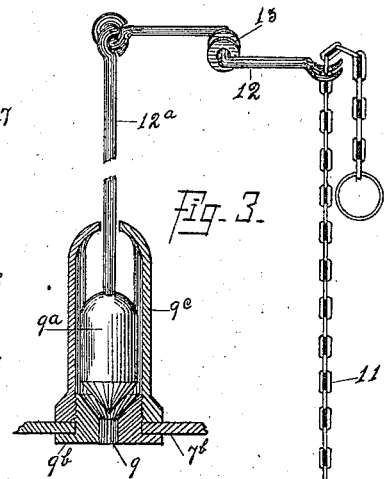
Figure 2:
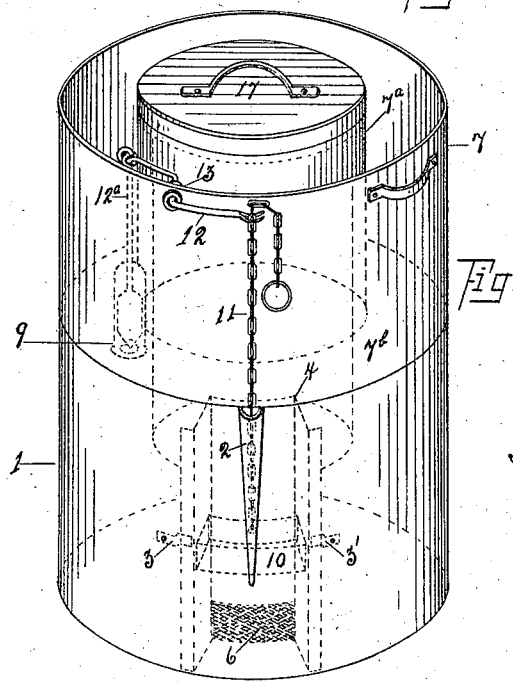
Figure 4:
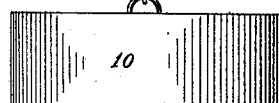

Figure 1 is a central vertical section through an applied embodiment of my improvement; Fig. 2 is a perspective view of the device, looking in a direction at right-angles to Fig. 1; Fig. 3 is a detail view, partly in section, of the improved means for controlling the level of liquid in the vessel, and Fig. 4 is a detail sectional view of a float-well in position. In carrying out my invention, I provide a cooking vessel 1, which may obviously be of any convenient shape, but is preferably cylindrical, and is fitted at one side with a small spout 2, adapted to form an opening for the entrance of a float-chain, as hereinafter described. On the inner surface of the wall of the vessel 1, are riveted or otherwise fastened the cleats 3—3', placed equidistant from the spout 2, and adapted to slidably receive the side-flanges of the U-shaped member 4, which when in position provides an inclosed well 5, having in its lower central portion a strainer 6, adapted to admit to the well only liquid parts of the contents of the vessel.

Upon the vessel 1 is placed an upper vessel or tank 7, reduced at its bottom to form a shoulder 8 for engagement with the rim of the vessel 1 in such a manner as to hold the said tank in position on the vessel 1, and to bring the outer vertical surfaces of the two vessels respectively flush with each other. The tank 7 is composed of an outer cylinder and an inner concentric cylinder $7^a$, open throughout its length, said cylinders providing an annular space having a bottom $7^b$, with a valve 9 therein, and adapted to receive and hold the liquid to be automatically fed to the lower vessel.

The float 10, which is a hollow air-tight metal box, its four vertical sides conforming in shape to the well 5, is placed within said well and rests on the surface of the liquid therein, which liquid communicates with that in the vessel 1 through the strainer 6. To the top surface of the float 10 is attached a chain 11, which extends upward through the opening of the spout 2 and adjustably connects at the outside of the tank 7 with one arm of a Z-shaped lever 12, which lever is journaled centrally of its length at 13, in an opening through the wall of the cylinder 7, and has its other arm connected to the movable member $9^a$ of the valve 9 through the vertical rod $12^a$. A bearing for holding the Z-shaped lever 12 in position is provided by the washers at 13.

The valve 9 is composed of a conical male member $9^a$, ground to seat in a flanged and threaded female member $9^b$, and a tapped, clip-like member $9^c$, adapted to engage the threaded end of the female member $9^b$, holding the valve rigidly in position, and providing a guide and retaining clip for the movable member $9^a$, thus preventing the latter from getting out of position when the vessel is tilted or inverted. Within the cylinder $7^a$ I may place an in-set vessel 14, enlarged at its top to form a shoulder 15 for engagement with the rim of the cylinder $7^a$ so as to suspend the vessel 14 centrally of the said cylinder $7^a$, and provide an annular steam-space 16 between the two. The vessel 14 is provided with a cover 17 which may be placed directly on the cylinder 7ª when the vessel 14 is not in use.

From the foregoing description of the device the operation thereof may be readily understood.

The lower vessel 1, partly filled with liquid serves as a cooking vessel; the tank 7 is filled with water, which is held therein by the self-closing valve 9. The chain 11 is now made taut as possible without lifting the float 10 from its seat on the surface of the water in the well 5, and is fastened in that position to the outer arm of the lever 12. Now, as the water in the vessel 1 boils away the float 10 sinks, drawing down on the outer arm of the lever 12, and raising the inner arm thereof, unseating the valve 9. The water will now flow from the tank to the lower vessel until the level of water therein has risen to its normal or predetermined point, when the tension will be removed from the chain 11, and the valve member 9ª will seat itself of its own weight, stopping and preventing further flow of liquid from the tank until the level of liquid in the lower vessel again sinks below the predetermined point.

With the construction described, it may be seen that the liquid in the lower vessel may be maintained at any desired level, and that this level may be varied by attaching the chain at different points along its length to the lever 12.

I claim:—

1. In a cooking utensil, a lower vessel, a detachable tank fitting in the upper end of the lower vessel, said tank having an opening, a movable valve adapted to open and close said opening, a float within the lower vessel, a lever pivoted to the upper portion of the tank having one end of the lever connected with the valve, the opposite end of the lever located outside of the tank, the lower vessel having an opening extending outside of the said tank, and a flexible connection having its upper end connected to the end of the lever outside of the tank, with its lower end passing through the said opening in the lower vessel and into the lower vessel and connected with the said float, the parts constructed and arranged to operate as described.

2. In a cooking utensil, a lower vessel, a detachable tank fitting in the upper end of the lower vessel and provided with an opening communicating with the lower vessel, a movable valve adapted to open and close said opening, a Z-shaped lever having its central portion pivoted in the upper end of the wall of the tank with one end in the tank and connected with the said valve, the opposite end of the lever located outside of the tank, the lower vessel having a float chamber, the wall of the lower vessel having an upwardly and laterally extending opening communicating with the float chamber with its upper end in a plane outside of the bottom of the tank, a chain having its upper end outside of the tank and the vessel, the outer end of said lever having a projection to detachably receive the links of the chain for the purpose described, the lower end of the chain passing through the opening and into the float chamber, and a float within the chamber connected with the lower end of the chain, the parts operating substantially as and for the purpose described.

3. In a cooking utensil, a lower vessel provided with an opening and having a U-shaped well adjacent to said opening, an annular tank ranged to be placed upon said lower vessel and provided with an opening in its bottom, a float disposed within the said well, a Z-shaped lever journaled at its central portion in the side wall of the said annular tank, a chain attached to said float and to the outer arm of said Z-shaped lever and arranged for movement through said opening, and a conical valve loosely attached to the inner arm of the said Z-shaped lever and arranged to close the opening in the bottom of said annular tank.

In testimony whereof I have signed my name to this specification in the presence of two subscribing witnesses.

FRENCH NESTOR.

Witnesses:
  O. A. KNAPP,
  H. C. SANDERSON.

Copies of this patent may be obtained for five cents each, by addressing the "Commissioner of Patents, Washington, D. C."